United States Patent
Park

(10) Patent No.: US 7,668,206 B2
(45) Date of Patent: Feb. 23, 2010

(54) METHOD FOR AUTOMATICALLY SETTING TIME AND DIGITAL BROADCAST RECEIVING APPARATUS USING THE SAME

(75) Inventor: Chul-jun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 11/245,221

(22) Filed: Oct. 7, 2005

(65) Prior Publication Data

US 2006/0112412 A1  May 25, 2006

(30) Foreign Application Priority Data

Nov. 23, 2004  (KR)  ............... 10-2004-0096108

(51) Int. Cl.
*H04J 3/06* (2006.01)
(52) U.S. Cl. ............... 370/503; 348/460; 348/563
(58) Field of Classification Search ......... 370/310, 370/312, 503, 496, 522, 350; 375/344, 356; 348/E5.105, 194, 460, 563; 725/39; 455/524, 455/67.11
See application file for complete search history.

(56) References Cited

U.S. PATENT DOCUMENTS

| | | | |
|---|---|---|---|
| 5,812,205 A * | 9/1998 | Milnes et al. | 348/460 |
| 6,169,580 B1 * | 1/2001 | Shin et al. | 348/460 |
| 6,366,834 B1 * | 4/2002 | Hayes et al. | 701/1 |
| 6,433,831 B1 * | 8/2002 | Dinwiddie et al. | 348/553 |
| 2002/0038234 A1 * | 3/2002 | Fu et al. | 705/8 |
| 2002/0098857 A1 * | 7/2002 | Ishii | 455/502 |
| 2002/0149697 A1 * | 10/2002 | Yang | 348/510 |
| 2004/0073951 A1 * | 4/2004 | Bae et al. | 725/135 |
| 2005/0165543 A1 * | 7/2005 | Yokota | 701/204 |
| 2005/0190653 A1 * | 9/2005 | Chen | 368/21 |

FOREIGN PATENT DOCUMENTS

| | | |
|---|---|---|
| CN | 1304103 A | 7/2001 |
| CN | 1414812 A | 4/2003 |
| JP | 5-328322 A | 12/1993 |
| KR | 1998-067587 B1 | 9/1999 |
| KR | 10-2000-0026601 A | 5/2000 |
| KR | 10-2001-0018706 A | 3/2001 |

* cited by examiner

*Primary Examiner*—Min Jung
(74) *Attorney, Agent, or Firm*—Sughrue Mion, PLLC

(57) ABSTRACT

A method for automatically setting a time includes receiving a time set by a user and corresponding to a geographic region where a digital broadcast receiver is located, and then determining if a broadcast signal received by the digital broadcast receiver includes time information; if the broadcast signal includes the time information, calculating a difference between the set time and received time information; setting a time zone based on the difference in the digital broadcast receiver; and if a command to display time information is received, applying a time difference corresponding to the set time zone to the time information in the broadcast signal, which is received at the time the command is received, and displaying the resulting time information. A digital broadcast receiver using the method is also provided.

18 Claims, 4 Drawing Sheets

METHOD FOR AUTOMATICALLY SETTING TIME AND DIGITAL BROADCAST RECEIVING APPARATUS USING THE SAME

CROSS-REFERENCE TO RELATED APPLICATIONS

This application claims priority from Korean Patent Application No. 10-2004-0096108, filed on Nov. 23, 2004, the entire content of which is incorporated herein by reference.

BACKGROUND OF THE INVENTION

1. Field of the Invention

Methods and apparatuses consistent with the present invention relate to automatically setting a time, and more particularly, to automatically setting a time zone and a daylight saving time (DST) based on a current time previously input to a digital broadcast receiver and a time transmitted to the digital broadcast receiver.

2. Description of the Related Art

FIG. 1 is a flowchart illustrating a conventional method for setting a time in a digital television.

Referring to FIG. 1, a command to display time information is first input (S11). That is, a command to display information about a current time is input to the digital television.

A determination is then made as to whether time information is transmitted to and received at the digital television (S13). The determination as to whether the time information is transmitted to the digital television is made based on whether a broadcast signal received by the digital television includes the time information, i.e., whether the broadcast signal includes a packet identification (PID) indicating the time information.

If the digital television receives the broadcast signal including the time information, a determination is made as to whether a time zone is set in the digital television (S15). Here, the time zone refers to a zone (i.e., a geographic region) in which the same time is used. Time zones are generally centered on meridians of a longitude that is a multiple of 15°. Since the time information transmitted to the digital television is a standard time with no time difference corresponding to the time zone applied thereto, a determination as to whether to apply a time difference corresponding to the time zone to the transmitted time information is made based on whether such a time zone is set in the digital television. The time zone is set by a user via a time zone setup menu selected from among function menus of the digital television. Using the time zone setup menu, the user selects a given time zone from among displayed time zones. The time difference corresponding to the selected time zone will be applied to the transmitted time information to thereby calculate a current time.

If the time zone is set, it is applied to calculate the current time (S17). For example, if the time zone is set as Bangkok, the current time is calculated by adding two hours to the transmitted time information since the time difference corresponding to the time zone is −2 hours. If the time zone is not set, a default time zone is applied to calculate the current time (S19).

A determination is then made as to whether information about a daylight saving time (DST) is received by the digital television and the DST is set in the digital television (S21). Here, the DST precedes a standard time of a given zone by one hour to effectively utilize a longer daylight time in summer.

If the information on the DST is received by the digital television and the DST is set in the digital television, a current time is calculated by applying the DST, i.e., by subtracting one hour from a time obtained through application of the time difference corresponding to the time zone (S23).

Subsequently, in response to receiving a command to display time information, the calculated time information is displayed (S25). If the DST is not set in the digital television in S21, time information is displayed to which only the time difference corresponding to the time zone has been applied.

Meanwhile, if the time information is not transmitted to and received at the digital television in S13, a message is displayed indicating that there is no time information, in response to receiving the command to display the time information (S27).

In this conventional time setting method, a user has to manually input the time zone and/or set the DST. If the user does not have sufficient knowledge about the time zone or DST, he or she may set a wrong time zone or DST. Setting the wrong time zone or DST causes the user to continue to obtain time information with the wrong time zone or DST applied thereto.

For example, if a user sets the digital television to be automatically turned on or off, the ON/OFF operation of the digital television is performed based on a time set in the digital television. In this case, setting the wrong time zone or DST causes the ON/OFF operation of the digital television to be performed based on a time different from the current time of a region where the digital television is located. Accordingly, the ON/OFF operation of the digital television is not performed at a time desired by the user.

Similarly, when the user desires to obtain an electronic program guide (EPG), he or she will obtain information about a broadcast program schedule based on the time set in the digital television. Accordingly, setting the incorrect time zone or DST causes a user to obtain an electronic program guide different from a desired broadcast program guide or to obtain no electronic program guide.

SUMMARY OF THE INVENTION

Accordingly, it is an aspect of the present invention to provide a method for automatically setting a time and a digital broadcast receiver using the same, which automatically sets a time zone and a daylight saving time (DST) based on a current time input to the digital broadcast receiver and time information included in a received broadcast signal.

This aspect of the present invention is realized, for example, by providing a method for automatically setting a time, including: receiving a set time of a region where a digital broadcast receiver is located, and then determining whether a received broadcast signal includes time information; if the broadcast signal includes the time information, calculating a time difference between the set time and the received time information; setting a time zone corresponding to the time difference in the digital broadcast receiver; and if a command to display time information is received, applying a time difference corresponding to the set time zone to the time information in a broadcast signal received upon the receipt of the command and displaying the resulting time information.

The time information may include, for example, a current time of the region where the digital broadcast receiver is located, electronic program guide (EPG) information, an on operation time of the digital broadcast receiver set in advance and an off operation time of the digital broadcast receiver set in advance.

Preferably, but not necessarily, if the received broadcast signal includes information about a DST, the DST may be set in the digital broadcast receiver and the received time minus one hour may be displayed as the time information.

The method may further include determining whether a command to set the time zone is input; and if the command to set the time zone is input, applying the time difference corresponding to the input time zone to the received time and displaying the time information.

If the received broadcast signal includes no time information, a message may be displayed indicating that there is no time information to be displayed.

In accordance with another aspect of the present invention, there is provided a digital broadcast receiver using automatic time setup, the digital broadcast receiver including: a signal processing unit which performs signal processing so that a received broadcast signal is displayed and extracts time information from the received broadcast signal; a calculating unit which calculates a first time difference between the time information extracted by the signal processing unit and a previously input time of a region where the digital broadcast receiver is located; a timer which stores the previously input time of the zone where the digital broadcast receiver is located and enables the stored time to proceed; a storage unit which stores information about the first time difference and information about specific time zones and respective time differences of the specific time zones; and a controlling unit which sets a time zone corresponding to the first time difference in the digital broadcast receiver based on the first time difference, and if a command to display time information is received, applies a second time difference corresponding to the set time zone to time information from a broadcast signal received upon the receipt of the command input to display the time information.

The time information may include, for example, a current time of the region where the digital broadcast receiver is located, electronic program guide (EPG) information, an on operation time of the digital broadcast receiver set in advance and an off operation time of the digital broadcast receiver set in advance.

The controlling unit may set a DST in the digital broadcast receiver if the received broadcast signal includes information about the daylight saving time, such that the time information is calculated as the received time minus one hour.

Further, the controlling unit may determine whether a command to set the time zone is input, and if the command to set the time zone is input, apply the time difference corresponding to the input time zone to the received time to determine the time information, thereby enabling the correct time information to be displayed.

If the received broadcast signal includes no time information, the controlling unit may enable a message to be displayed indicating that there is no time information.

The storage unit may store information about a daylight saving time (DST), if the received broadcast signal includes the information about the DST.

The digital broadcast receiver may further include a display unit for displaying the specific time zones and respective time differences of the specific time zones, and the time information.

BRIEF DESCRIPTION OF THE DRAWINGS

The above and other aspects of the present invention will be more apparent by describing exemplary embodiments of the present invention with reference to the accompanying drawings, in which.

DETAILED DESCRIPTION OF THE EXEMPLARY EMBODIMENTS

Hereinafter, exemplary embodiments of the present invention will be described in greater detail with reference to the accompanying drawings.

Figure 1:
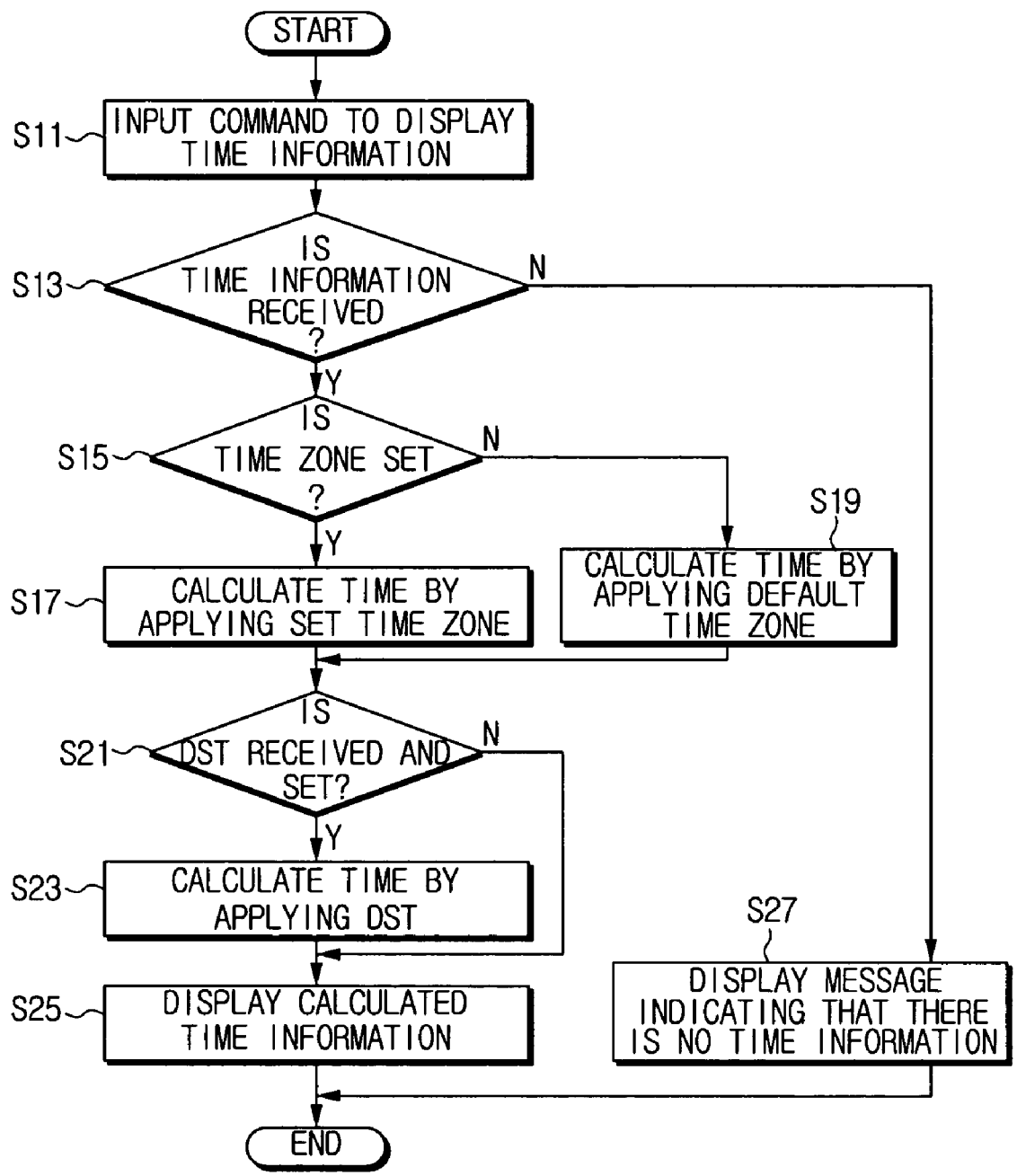
FIG. 1 is a flowchart illustrating a conventional method for setting a time in a digital television.
Figure 2:
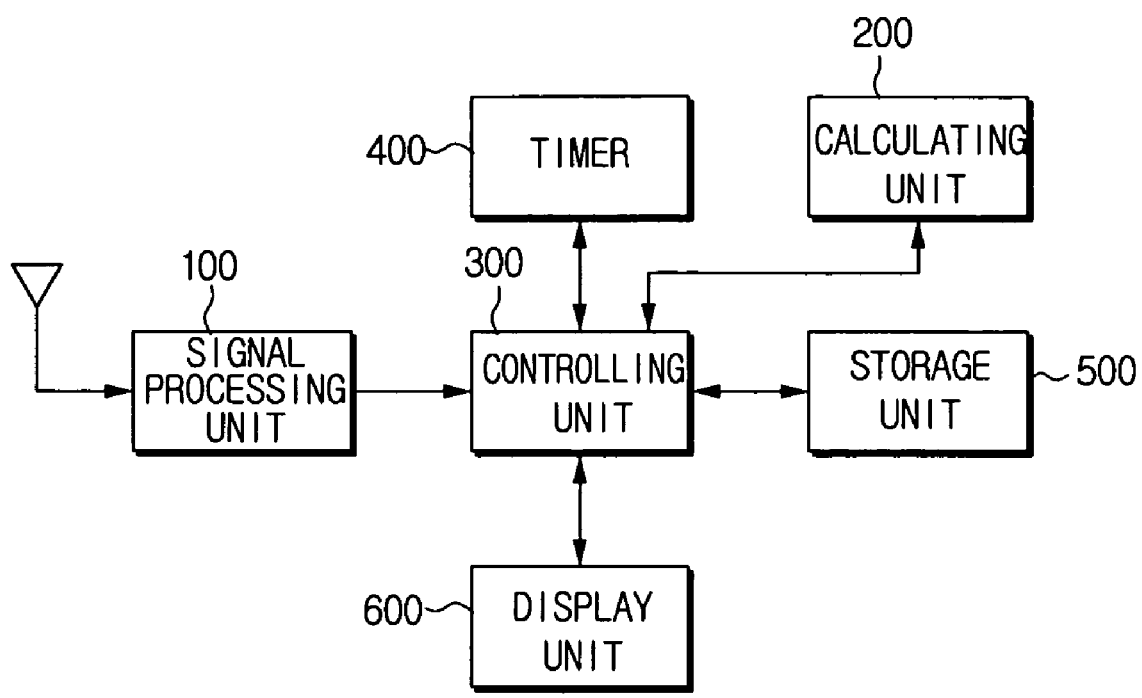
FIG. 2 is a block diagram of a digital broadcast receiver using a method for automatically setting a time, according to an exemplary embodiment of the present invention.

FIG. 2 is a block diagram of a digital broadcast receiver based on a method for automatically setting a time, according to an exemplary embodiment of the present invention.

Referring to FIG. 2, a digital broadcast receiver using a method for automatically setting a time includes a signal processing unit 100, a calculating unit 200, a controlling unit 300, a timer 400, a storage unit 500, and a display unit 600.

First, the signal processing unit 100 performs signal processing so that a broadcast signal received via an antenna is displayed on the display unit 600. The signal processing unit 100 also separates an additional signal such as time information from the received broadcast signal. For example, when receiving a system time table (STT) of a program system information protocol (PSIP), the signal processing unit 100 extracts time information from the time table. The extracted time information is stored in the storage unit 500. Further, the signal processing unit 100 extracts EPG information from an event information table (EIT) of the PSIP. The EPG information is stored in the storage unit 500. If a command to display an electronic program guide is input, the EPG information stored in the storage unit 500 is displayed as the electronic program guide on the display unit 600.

The storage unit 500 stores a current time, which is input by a user, of a region where the digital broadcast receiver is located. The storage unit 500 also stores information about a number of time zones and respective time differences of the time zones, as well as information about the DST, so that a specific time zone or DST can be set. Here, a time zone refers to a zone (i.e., a geographic region) throughout which the same time is used, based on certain longitudes that are divided at both sides of meridians as integer multiples of 15°. The DST precedes a standard time of a specific time zone by one hour, and in setting the DST, one hour is subtracted from the time as calculated.

The calculating unit 200 calculates a difference between the current time of the region where the digital broadcast receiver is located, which is stored in the storage unit 500, and time information received by the digital broadcast receiver. The time information received by the digital broadcast receiver includes, for example, a current time independent of the region where the digital broadcast receiver is located. In this case, the current time of the time information received by the digital broadcast receiver is a Greenwich mean time (GMT). Accordingly, the current time is calculated based on a difference between the received GMT and a time at the region where the digital broadcast receiver is located.

The timer 400 stores a current time input to the digital broadcast receiver and enables the stored time to proceed.

The controlling unit 300 selects and sets a specific time zone corresponding to the time difference calculated by the calculating unit 200 based on the information about the time zones and the respective time differences of the time zones stored in the storage unit 500. The controlling unit 300 also sets the DST in the digital broadcast receiver, if information about the DST is received by the digital broadcast receiver. If a command to display the current time is input, the current time, which is calculated by applying the time difference corresponding to the time zone and/or the DST to the time information separated by the signal processing unit 100, is displayed.

If a current-time setup menu, a time zone or DST setup menu, or an electronic program guide display menu is selected, the display unit 600 displays the content of the selected menu.

Figure 3:
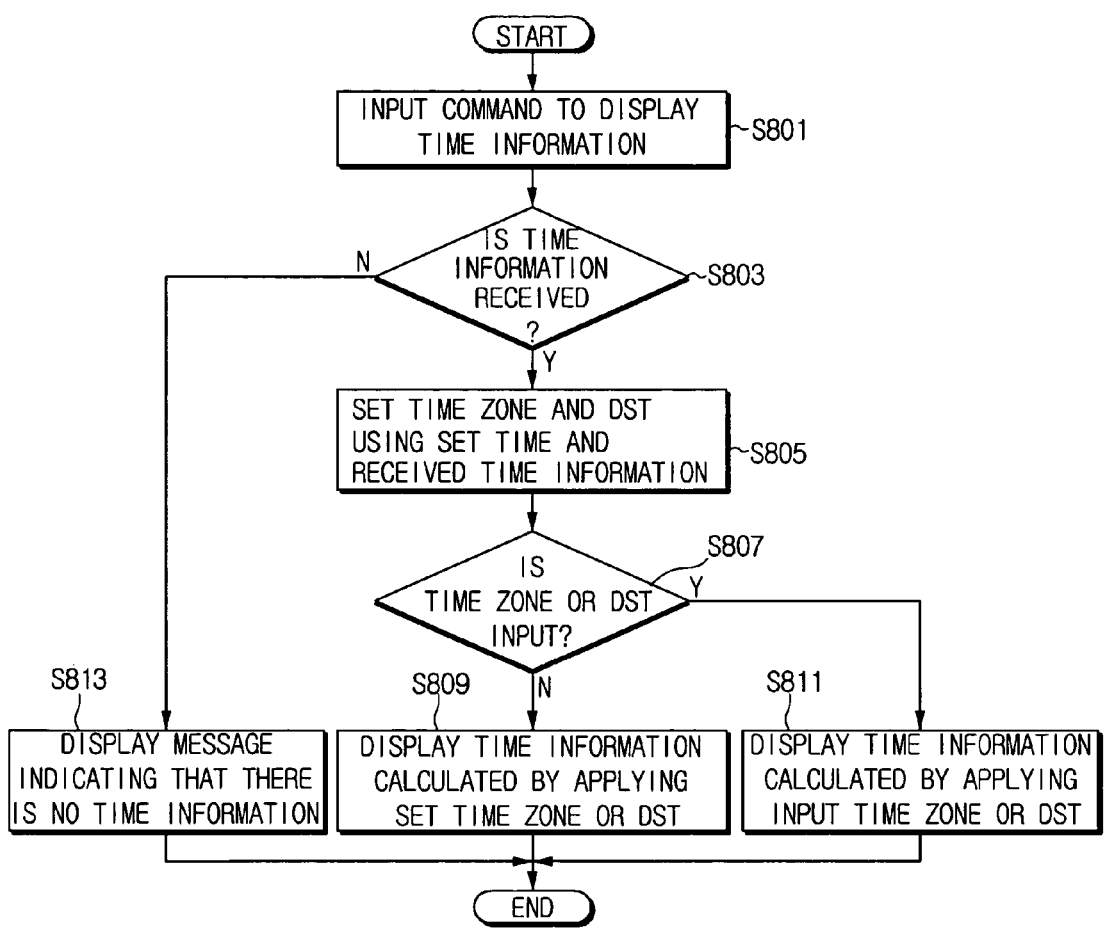
FIG. 3 is a flowchart illustrating a method for automatically setting a time, according to an exemplary embodiment of the present invention.

FIG. 3 is a flowchart illustrating a method for automatically setting a time according to an exemplary embodiment of the present invention.

Referring to FIG. 3, a command to display time information is input (S801). The time information includes, for example, a current time of a region where a digital broadcast receiver is located, EPG information, and an ON/OFF operation time of the digital broadcast receiver. A current time, however, should first should be input to the digital broadcast receiver to thereby display the time information. The current time is input by a user setting the current time on a current-time setup menu using an operational unit, such as a remote control.

A determination is then made as to whether the time information is received by the digital broadcast receiver, by determining if a broadcast signal received by the digital broadcast receiver includes the time information (S803). The broadcast signal received by the digital broadcast receiver may include the time information, in addition to an image signal.

The time information may be included and transmitted in an STT of a PSIP. In this case, the time information is separated from other received information and, thereafter, stored in a storage unit. Accordingly, a determination of whether the time information is received by the digital broadcast receiver may be based on whether there is an STT.

If the broadcast signal includes the time information, this time information, along with the current time set in the digital broadcast receiver, is used to automatically set the time zone and the DST (S805). The time zone is determined by calculating a difference between the time set in the digital broadcast receiver and the received time information. The time information received by the digital broadcast receiver is, for example, a GMT. The time input to and set in the digital broadcast receiver by the user is a time of the zone where the digital broadcast receiver is located. There will generally be a difference between the received time information and the set time, i.e., a time difference due to the time zone.

Additionally, information on specific time zones and respective time differences corresponding to the specific time zones is stored in the storage unit. The time difference corresponding to the difference between the set time and the received time information is used to retrieve the specific time zone corresponding to the time difference from the storage unit, and the retrieved time zone is set as the time zone. Furthermore, if DST information is received by the digital broadcast receiver, the DST is applied to and set in the time information. That is, if the DST is set, one hour is subtracted from the calculated time information.

A determination is then made as to whether the time zone and/or DST is input (S807). This is to assure that, if the time zone and/or the DST is manually input, the manually input time zone and/or DST is preferentially applied, instead of the time zone and/or DST set based on the time set in the digital broadcast receiver and the received time information. In this case, the time zone may be set by the user selecting a specific time zone from among the time zones displayed via a menu on a display unit.

If the time zone and/or the DST is not manually input, the time zone and/or the DST which is set based on the set time in the digital television and the received time information is applied to thereby display the time information (S809). That is, if a command to display the current time is input, an automatically set time zone and/or DST is applied to the time information received by the digital broadcast receiver to add a time difference to or subtract a time difference from the transmitted time information, such that a correct current time of the zone where the digital broadcast receiver is located is displayed. This may prevent the user from continuing to obtain incorrect time information, in the event that the user sets an incorrect time zone in the digital broadcast receiver.

If the time zone or the DST is manually input, the input time zone or DST is applied and the time information is displayed (S811). This is useful when the user desires to obtain time information of a region different from the region where a digital broadcast receiver is located.

If, however, the time information is not received by the digital broadcast receiver in S803, a message indicating that there is no time information is displayed (S813). That is, if the broadcast signal received by the digital broadcast receiver does not include the time information, a message is displayed indicating that there is no time information.

Figure 4A:
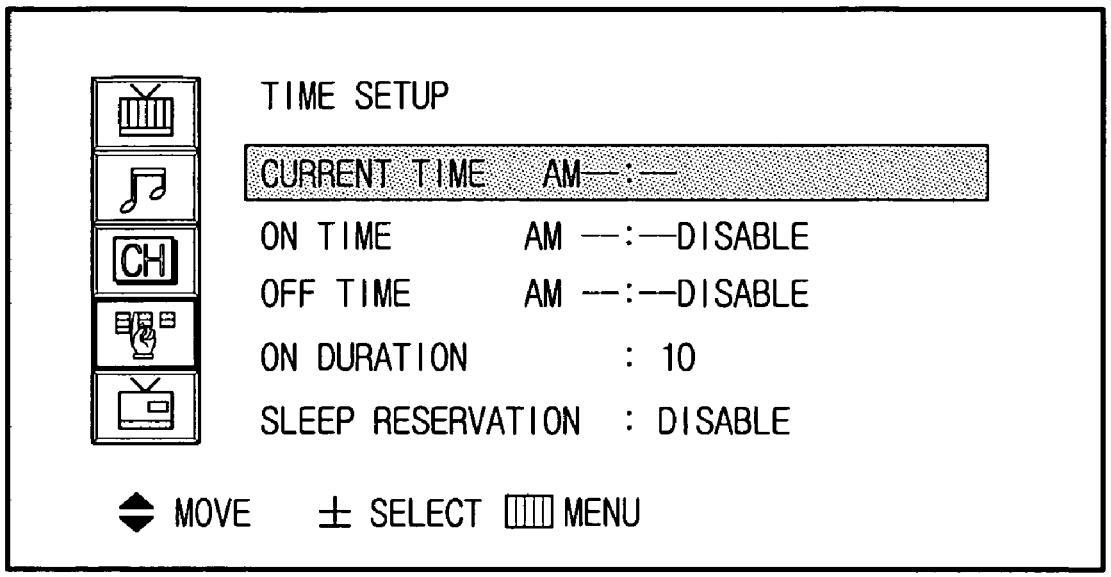
FIGS. 4A and 4B illustrate current time and time zone setup screens, respectively, in a method for automatically setting a time, according to an exemplary embodiment of the present invention.
Figure 4B:
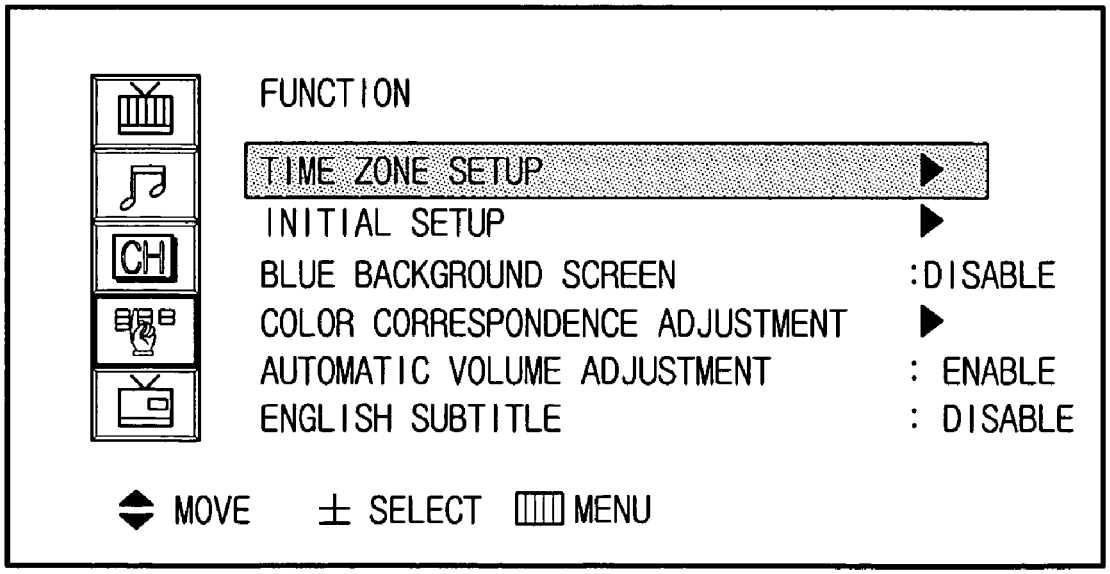

FIGS. 4A and 4B respectively illustrate current time and time zone setup screens in a method for automatically setting a time according to an exemplary embodiment of the present invention. FIG. 4A is a current-time setup screen displayed on a display unit of a digital broadcast receiver, and FIG. 4B is a time zone setup screen displayed on a display unit of a digital broadcast receiver. That is, FIG. 4B shows an example in which a user manually inputs a time zone.

Referring to FIG. 4A, a user selects a current-time setup menu using an operational unit (not shown) such as a remote control, and then inputs a current time of a region where a digital broadcast receiver is located.

Referring to FIG. 4B, a user selects a time zone setup menu using an operational unit (not shown) such as a remote control, and then selects a time zone corresponding to a region where a digital broadcast receiver is located from among displayed time zones. If the time zone setup menu is selected, a map divided into regions representing the various time zones is displayed on the display unit, such that the user can select a specific time zone. Alternatively, the time zones and their respective time differences may be displayed in a table format, such that the user can select a specific time zone.

The same techniques can be used to set the DST. That is, a user selects a DST setup menu, and then inputs whether to apply the DST.

As described above, according to the present invention, a user is able to obtain correct time information since the time zone and/or the DST is automatically set in a digital broadcast receiver, if the user sets the current time of the region where the digital broadcast receiver is located.

Additionally, use of the time information with the correct time zone and/or the DST applied thereto prevents an automatic ON/OFF function from malfunctioning, if the automatic ON/OFF function is set in the digital broadcast receiver, and enables a correct EPG to be provided to the user.

The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for automatically setting a time, the method comprising:

setting a first time by a user, said first time corresponding to a region where a digital broadcast receiver is located;

storing time zone information on a plurality of time zones and respective time differences between the plurality of time zones in a storage unit; and if a broadcast signal received by the digital broadcast receiver includes time information indicating a second time:

calculating a difference between the first time set by the user and the second time from the broadcast signal;

automatically selecting a first time zone from among the plurality of time zones stored in the storage unit, by retrieving the first time zone corresponding to the difference between the first time and the second time from the storage unit, and setting the selected first time zone as a current time zone in the storage unit of the digital broadcast receiver; and if a command to display time information is received, applying a time difference corresponding to the first time zone to the time information in the broadcast signal received at a time when the command to display the time information is received to obtain adjusted time information, and displaying the adjusted time information.

2. The method as claimed in claim 1, wherein the second time is independent of the region where the digital broadcast receiver is located.

3. The method of claim 2, wherein the second time is a Greenwich mean time.

4. The method as claimed in claim 1, wherein the time information includes at least one of a current time of the region where the digital broadcast receiver is located, electronic program guide information, an on operation time of the digital broadcast receiver set in advance and an off operation time of the digital broadcast receiver set in advance.

5. The method as claimed in claim 1, wherein if the broadcast signal received by the digital broadcast receiver includes information to apply daylight saving time, the information to apply daylight saving time is set in the digital broadcast receiver, and one hour is subtracted from the adjusted time information.

6. The method as claimed in claim 1, further comprising:

determining if a command to set a second time zone is input; and if the command to set the second time zone is input, applying the time difference corresponding to the second time zone to the time information in the broadcast signal received by the digital broadcast receiver to obtain the adjusted time information; and displaying the adjusted time information.

7. The method as claimed in claim 1, further comprising if the broadcast signal received by the digital broadcast receiver includes no time information, displaying a message indicating that there is no time information.

8. A digital broadcast receiver using automatic time setup, the digital broadcast receiver comprising:

a signal processing unit which performs signal processing on a broadcast signal received by the digital broadcast receiver to display the broadcast signal and extract time information indicating a second time from the broadcast signal;

a calculating unit which calculates a difference between the second time and a previously input first time corresponding to a region where the digital broadcast receiver is located, the first time being input to the digital broadcast receiver by a user;

a timer which stores the first time and enables the first time to proceed;

a storage unit which stores information about the difference between the second time and the first time, and information about a plurality of time zones and time differences between the plurality of time zones; and a controlling unit which automatically selects a specific time zone from among the plurality of time zones in the digital broadcast receiver based on the difference between the second time and the first time and sets the selected specific time zone as a current time zone in the storage unit, and if a command to display time information is received, the controlling unit applies a time difference corresponding to the specific time zone to the time information in the broadcast signal received at a time when the command to display the time information is received to obtain adjusted time information, and displays the adjusted time information.

9. The digital broadcast receiver as claimed in claim 8, wherein the second time is a time independent of the region where the digital broadcast receiver is located.

10. The digital broadcast receiver as claimed in claim 8, wherein the second time is a Greenwich mean time.

11. The digital broadcast receiver as claimed in claim 8, wherein the time information includes at least one of a current time of the region where the digital broadcast receiver is located, electronic program guide information, an on operation time of the digital broadcast receiver set in advance and an off operation time of the digital broadcast receiver set in advance.

12. The digital broadcast receiver as claimed in claim 8, wherein if the broadcast signal received by the digital broadcast receiver includes information to apply daylight saving time, the controlling unit sets the information to apply daylight saving time in the digital broadcast receiver, and subtracts one hour from the adjusted time information.

13. The digital broadcast receiver as claimed in claim 12, wherein the storage unit stores the information to apply daylight saving time.

14. The digital broadcast receiver as claimed in claim 8, wherein the controlling unit determines whether a command to set a second time zone is input, and if the command to set the second time zone is input, applies the time difference corresponding to the second time zone to the time information in the broadcast signal received by the digital broadcast receiver to obtain the adjusted time information, and enables display of the adjusted time information.

15. The digital broadcast receiver as claimed in claim 8, wherein if the broadcast signal received by the digital broadcast receiver includes no time information, the controlling unit enables a message to be displayed indicating that there is no time information.

16. The digital broadcast receiver as claimed in claim 8, further comprising a display unit which displays the time zones and the time differences corresponding to the time zones, and the adjusted time information.

17. The digital broadcast receiver as claimed in claim 8, wherein the selected first time zone is a time zone corresponding to the region where the digital broadcast receiver is located.

18. The digital broadcast receiver as claimed in claim 8, wherein the first time is an approximate time of a current time corresponding to the region where the digital broadcast receiver is located.

* * * * *

UNITED STATES PATENT AND TRADEMARK OFFICE
CERTIFICATE OF CORRECTION

PATENT NO.        : 7,668,206 B2                                              Page 1 of 1
APPLICATION NO.   : 11/245221
DATED             : February 23, 2010
INVENTOR(S)       : Chul-jun Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Twenty-eighth Day of December, 2010

David J. Kappos
*Director of the United States Patent and Trademark Office*